United States Patent
Furuichi (10) Patent No.: US 6,988,409 B2
(45) Date of Patent: Jan. 24, 2006

(54) DYNAMIC QUANTITY SENSOR

(75) Inventor: Akihisa Furuichi, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/808,585

(22) Filed: Mar. 25, 2004

(65) Prior Publication Data

US 2004/0237651 A1    Dec. 2, 2004

(30) Foreign Application Priority Data

Mar. 25, 2003    (JP)    ............... 2003-082834

(51) Int. Cl.
*G01P 15/125*    (2006.01)

(52) U.S. Cl. .................... 73/514.32; 73/1.38
(58) Field of Classification Search ............. 73/514.32, 73/1.38, 514.18, 1.39; 324/661, 672, 678, 324/686

See application file for complete search history.

(56) References Cited

U.S. PATENT DOCUMENTS 6,257,061 B1    7/2001    Nonoyama et al.
6,418,790 B1    7/2002    Yukawa et al.
6,483,322 B2 *    11/2002    Aoyama et al. ............ 324/661
6,601,431 B2 *    8/2003    Nagahara et al. ............ 73/1.38
6,668,614 B2 *    12/2003    Itakura ....................... 73/1.38

FOREIGN PATENT DOCUMENTS

| JP | 4-364431 | 12/1992 |
| JP | 9-264929 | 10/1997 |
| JP | 2000-81449 | 3/2000 |
| JP | 2001-56224 | 2/2001 |

* cited by examiner

*Primary Examiner*—Helen Kwok
(74) *Attorney, Agent, or Firm*—Posz Law Group, PLC (57) ABSTRACT

A sensor element includes a pair of differential capacitors having capacitances C1 and C2 causing a complementary capacitance change in response to an applied acceleration. An additional capacitor is connected to either capacitor to generate a capacitance difference between the capacitance C1 and the composite capacitance C2+C3. This enables to adjust an input LPFout of a correcting circuit correcting the offset level of the sensor output Gout in such a manner that a correction amount in the correcting circuit becomes large and accordingly deviates sufficiently from a reference level Vref. In case of failure in which the input of the correcting circuit is fixed to the reference level Vref, the sensor output Gout surely deviates from the reference level Vref by an amount equivalent to the correction in the correcting circuit.

5 Claims, 5 Drawing Sheets

RELATED ART

DYNAMIC QUANTITY SENSOR

BACKGROUND OF THE INVENTION

The present invention relates to a dynamic quantity sensor used for detecting various dynamic quantities, such as acceleration, angular velocity, voltage or the like.

For example, an acceleration sensor, as one of dynamic quantity sensors, is used for collision detection in an airbag system or any other automotive device. However, the sensor output tends to vary due to aging effect occurring in the circuit elements constituting the sensor or due to ambient temperature or the like.

SUMMARY OF THE INVENTION

In view of the above-described problems, the present invention has an object to provide a dynamic quantity sensor capable of easily and accurately detecting sensor failure in an event that the sensor output is fixed to a reference level.

To accomplish the above and other related objects, the present invention provides a dynamic quantity sensor that includes a signal generating section generating a detection signal having a signal level representing an applied dynamic quantity and a signal correcting section correcting the detection signal produced from the signal generating section in such a manner that an unapplied level of the detection signal to be obtained when the dynamic quantity is not applied is equalized to a predetermined reference level, wherein the dynamic quantity sensor has a failure mode in which an output of the signal generating section is fixed to the reference level. According to the dynamic quantity sensor of this invention, the signal generating section adjusts the detection signal in such a manner that the signal correcting section generates a large correction amount sufficient for the output signal from the signal correcting section to deviate from a failure judgment unable region including the reference level in case of failure corresponding to the above failure mode.

According to the above-described dynamic quantity sensor of the present invention, when the signal generating section generates a detection signal having a signal level representing the applied dynamic quantity, the signal correcting section corrects the detection signal in such a manner that the unapplied level of the detection signal to be obtained when the dynamic quantity is not applied is equalized to a predetermined reference level.

However, in case of failure corresponding to the failure mode in which the output of the signal generating section is fixed to the reference level, the signal generating section executes the adjustment in such a manner that the output signal from the signal correcting section can deviate from a failure judgment unable region including the reference level. Namely, the signal correcting section generates the detection signal to which a large correction amount is applied by the signal correcting section.

More specifically, the dynamic quantity sensor of the present invention utilizes the phenomenon that, in case of failure according to the above-described failure mode, the output of the signal correcting section deviates from the reference level by a correction amount in this signal correcting section. According to the dynamic quantity sensor of the present invention, the correction amount is enlarged so that the output of the signal correcting section is surely fixed to a signal level outside the failure judgment unable region.

Accordingly, the dynamic quantity sensor of the present invention enables to easily detect the failure corresponding to such a failure mode by solely monitoring the output level of the signal correcting section. The failure judgment unable region should be determined so as to have the capability of absorbing any fluctuation of the output signal in the stationary condition that may be caused due to temperature change, aging change, or any other non-failure change.

Preferably, the signal generating section includes a sensor element having a movable portion causing a displacement in accordance with an applied dynamic quantity and a signal conversion circuit converting the displacement of the movable portion into the detection signal having the signal level representing the applied dynamic quantity.

Furthermore, it is preferable that the sensor element includes first and second capacitive elements cooperatively causing a complementary capacitance change in response to the displacement of the movable portion. The signal conversion circuit includes a CV conversion circuit converting the complementary capacitance change caused in the first and second capacitive elements into a voltage change. And, the unapplied level of the detection signal is adjusted based on a capacitance ratio of the first and second capacitive elements under a condition that the dynamic quantity is not applied.

Regarding the capacitance ratio of the first and second capacitive elements, it is preferable that the first and second capacitive elements have different capacitances as manufactured conditions. Furthermore, it is preferable that the capacitance ratio of the first and second capacitive elements is later adjusted by connecting a third capacitive element in parallel with one of the first and second capacitive elements when these capacitive elements have been manufactured to have the same capacitance. Furthermore, regarding the provision of the third capacitive element, it is preferable to provide the third capacitive element together with the first and second capacitive elements on a substrate in the process of forming this substrate, or it is also preferable to add this third capacitive element to the sensor element or to the signal conversion circuit at later timing.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Fundamental Arrangement

Figure 6:
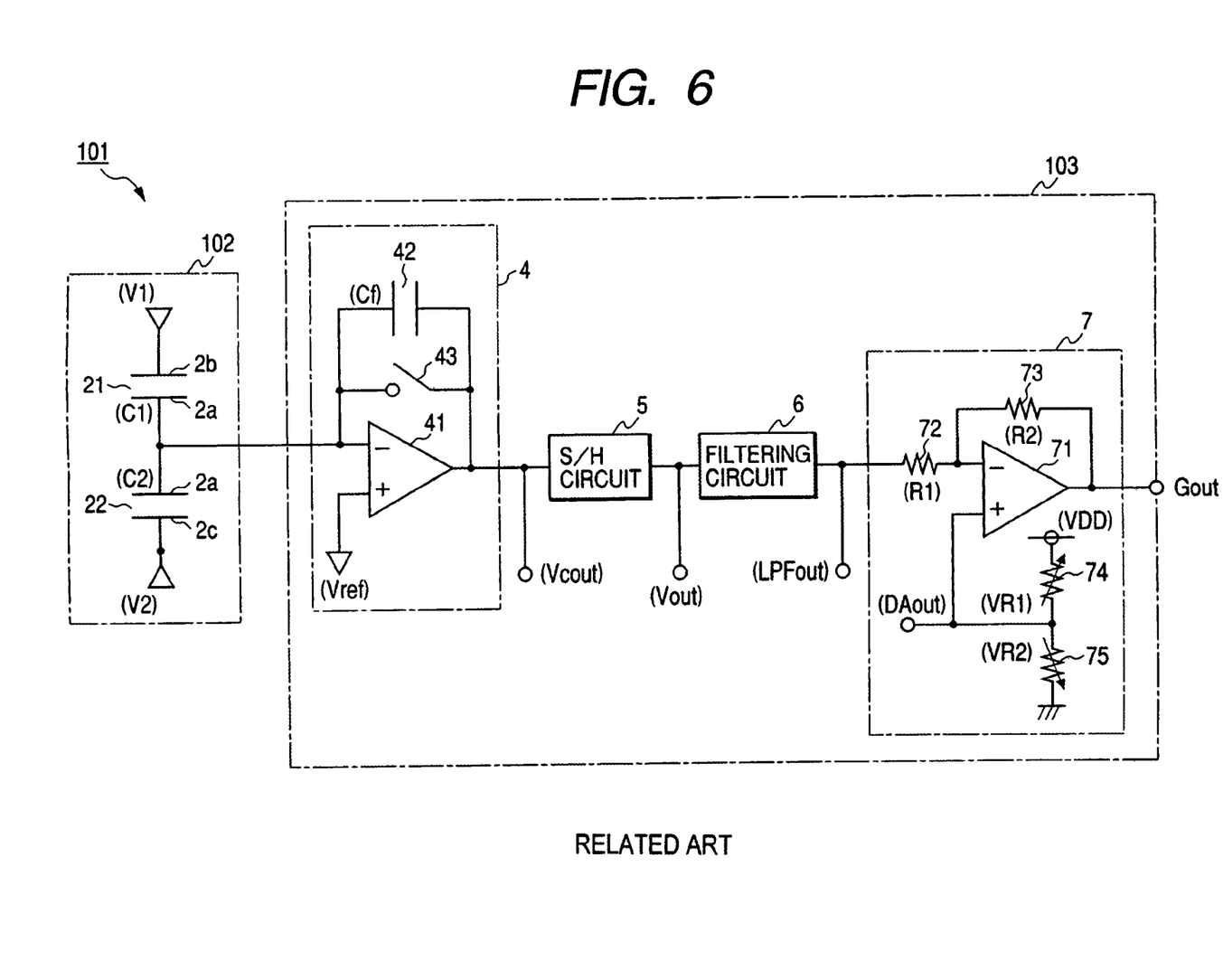
FIG. 6 is a circuit diagram showing the schematic arrangement of a basic acceleration sensor.

FIG. 6 is a block diagram showing the basic arrangement of a capacitance type acceleration sensor that is one of dynamic quantity sensors.

As shown in FIG. 6, a capacitance type acceleration sensor 101 includes a sensor element 102 and a detection circuit 103. The sensor element 102, formed on a substrate, has a beam structure that is capable of causing a displacement relative to the substrate in response to the acceleration or any other applied dynamic quantity. The capacitance type acceleration sensor 101 has a movable electrode 2a integrally formed with the beam structure and two stationary electrodes 2b and 2c disposed at both sides of the movable electrode 2a and fixed to the substrate. The movable electrode 2a and two stationary electrodes 2b and 2c are arranged so as to cooperatively define two differential capacitors 21 and 22.

More specifically, the beam structure causes a displacement in response to the acceleration applied to a body on which the sensor element 102 is installed. The displacement of the movable electrode 2a represents the magnitude of applied acceleration. The capacitances C1 and C2 of the differential capacitors 21 and 22 vary in accordance with the displacement of the movable electrode 2a. The differential capacitors 21 and 22 are initially set in such a manner that the capacitance C1 of the differential capacitor 21 is equal to the capacitance C2 of the differential capacitor 22 (i.e. C1=C2) when no acceleration is applied (i.e. in the "stationary" condition).

The detection circuit 103 includes a CV converting circuit 4, the sample-holding (S/H) circuit 5, a filtering circuit 6, and a correcting circuit 7. The CV converting circuit 4 converts the complementary change of capacitances C1 and C2 of respective differential capacitors 21 and 22 into a voltage value. The sample-holding (S/H) circuit 5 samples and holds an output voltage (Vcout) of the CV converting circuit 4 and amplifies the sample-held voltage to a predetermined sensitivity level by using a differential amplification circuit. The filtering circuit 6 removes noise components from the output voltage (Vout) of the S/H circuit 5. The correcting circuit 7 corrects the signal level of the output voltage LPFout (hereinafter, referred to as "intermediate output") of the filtering circuit 6.

The CV converting circuit 4 includes an operational amplifier 41 having an inverting input terminal connected to the movable electrode 2a and a non-inverting input terminal receiving a reference voltage Vref (which is approximately a half of the power source voltage VDD), and a capacitor 42 (having a capacitance Cf) and a switch 43 connected in parallel with each other between the inverting input terminal and the output terminal of the operational amplifier 41.

More specifically, the CV converting circuit 4 has a function of holding the movable electrode 2a to the reference voltage Vref and a function of charging the electric charge supplied from the sensor element 102 to the capacitor 42 by opening the switch 43, and also has a function of discharging the electric charge stored in the capacitor 42 by closing the switch 43 so as to equalize the electric potential of both terminals of the capacitor 42 to the same level (Vref=VDD/2).

A voltage V1 is applied to the stationary electrode 2b of the sensor element 102 and a voltage V2 is applied to the stationary electrode 2c. A control circuit (not shown) controls the voltage applied to the sensor element 102 in such a manner that a first period and a second period are alternately repeated, wherein the switching is carried out between V1=VDD and V2=0 in the first period and V1=0 and V2=VDD in the second period. Furthermore, in the first period, the switch 43 is once closed to discharge the capacitor 42 before the switch 43 is opened.

The S/H circuit 5 samples the output voltage Vcout of the CV converting circuit 4 carrying out the above-described control during the first period (i.e. after the switch 43 is opened) as well as during the succeeding second period. And, the S/H circuit 5 generates an output voltage Vout proportional to a difference between the output voltage Vcout in the first period and the output voltage Vcout in the second period. The following equation (1) is used to express the output voltage Vout and the output voltage LPFout of the filtering circuit 6.

$$LPFout = Vref + \frac{C1 - C2}{Cf} \cdot VDD \tag{1}$$

The relationship LPFout=Vref is satisfied in the stationary condition (i.e. in the condition of C1=C2). Therefore, the direction of an applied acceleration can be identified based on the judgment as to whether the output voltage LPFout is larger or smaller than the reference voltage Vref. The magnitude of the applied acceleration can be identified based the absolute value of a difference between the output voltage LPFout and the reference voltage Vref.

However, it is generally difficult to manufacture the differential capacitors 21 and 22 having capacitances C1 and C2 accurately agreeing with each other in the stationary condition. Accordingly, the actual relationship C1≠C2 causes an error (i.e. offset) in the output voltage LPFout. The correcting circuit 7 is provided to correct this error. The correcting circuit 7, as shown in FIG. 6, has a resistor 72 through which the output voltage of the filtering circuit 6 is applied to an inverting input terminal of an operational amplifier 71, and a resistor 73 connected between the inverting input terminal and the output terminal. These resistors 72 and 73 and the operational amplifier 71 cooperatively constitute the inverting amplification circuit. Furthermore, the correcting circuit 7 includes a pair of variable resistors 74 and 75 that constitute a dividing circuit generating an adjusting voltage DAout applied to a non-inverting input terminal of the operational amplifier 71.

The following equation (2) is used to express an output Gout of the correcting circuit 7 (hereinafter, referred to as "sensor output"), wherein R1 represents a resistor value of the resistor 72 and R2 represents a resistor value of the resistor 73.

$$Gout = -\frac{R2}{R1} \cdot (LPFout - DAout) + DAout \tag{2}$$

The setting of adjusting voltage DAout is carried out in such a manner that the sensor output Gout in the stationary condition becomes equal to the reference voltage Vref by adjusting the resistor values VR1 and VR2 of the variable resistors 74 and 75. In addition to adjustment of the output level in the stationary condition, the correcting circuit 7 performs the amplification of the signal level (i.e. amplification rate R2/R1).

The above-described acceleration sensor 101 can be used for collision detection in the airbag system or any other automotive device. In such a case, operation check of the acceleration sensor is usually performed immediately after the engine is started. More specifically, it is checked whether or not the sensor output Gout satisfies the relationship Gout=Vref in the stationary condition.

The sensor output Gout tends to vary due to aging effect occurring in the circuit elements constituting the sensor element 102 and the detection circuit 103 or due to ambient temperature. The sensor output Gout deviates from the reference voltage Vref. To prevent this deviation from being detected as abnormality, a predetermined allowable range (e.g. approximately 2.5±0.2V in the case of VDD=2.5V) is provided to detect such a deviation as normal.

However, the circuits 4, 5, and 6 use the reference voltage Vref to cooperatively generate the intermediate output LPFout based on the output of the sensor element 102. Thus, as one of failure modes, there will be a case that the intermediate output LPFout is fixed to the reference voltage Vref. In the case of this failure mode, the sensor output Gout is fixed in the above-described allowable range. The above-described operation check cannot detect or identify this kind of failure mode.

Preferred Embodiments

Hereinafter, preferred embodiments of the present invention will be explained with reference to the attached drawing.

Figure 1:
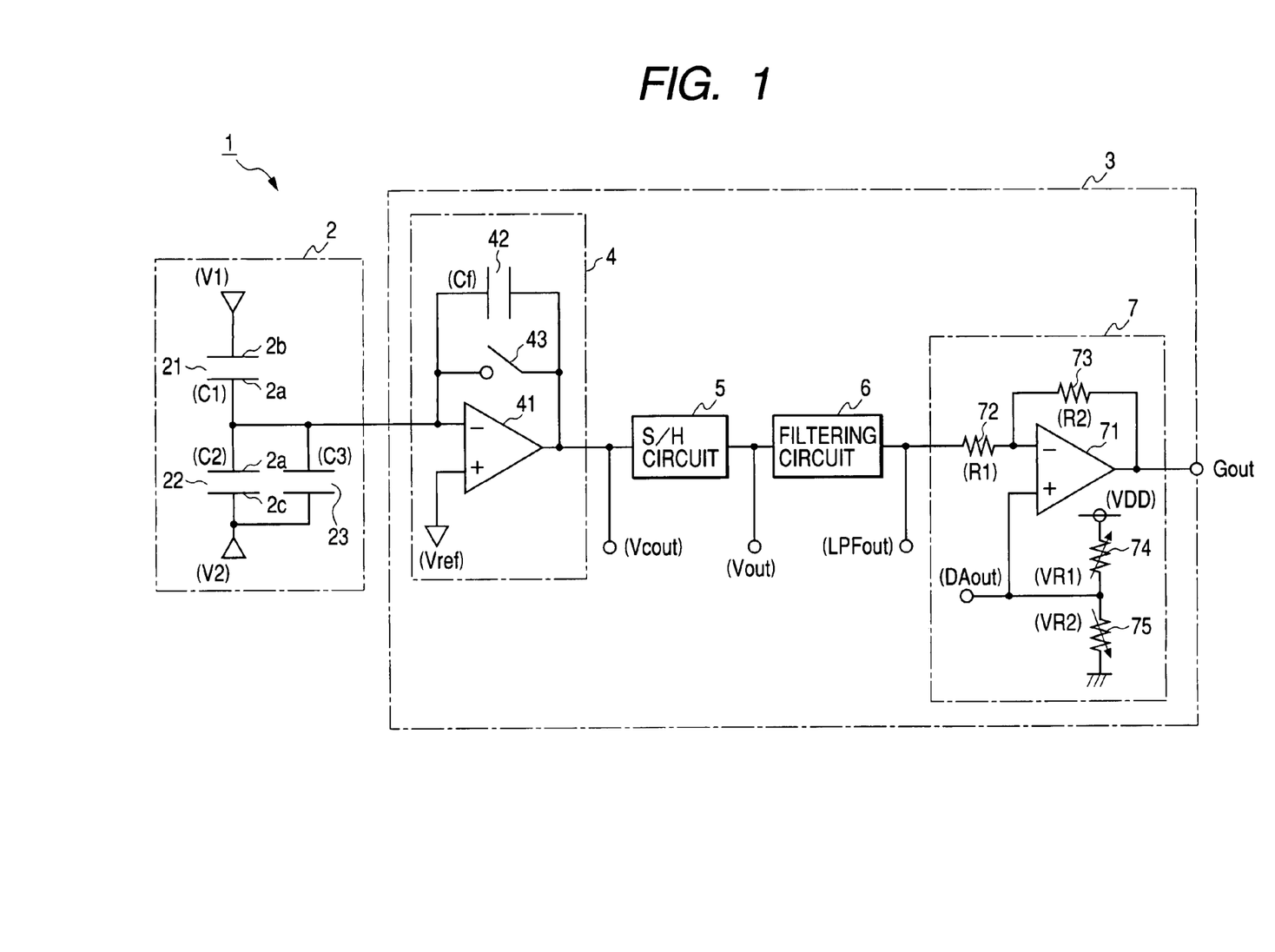
FIG. 1 is a circuit diagram showing the schematic arrangement of an acceleration sensor in accordance with a preferred embodiment of the present invention.
Figure 2A:
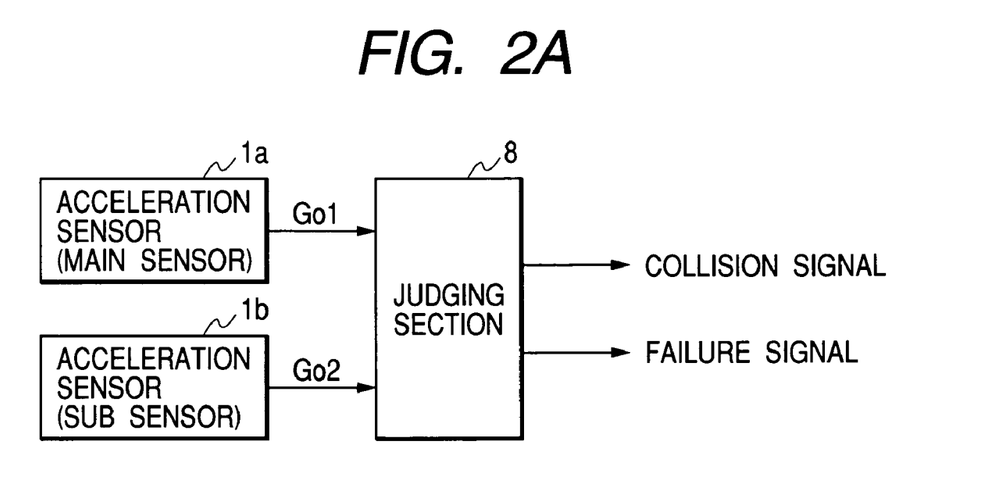
FIG. 2A is a block diagram showing the arrangement of a collision judging apparatus using the acceleration sensor in accordance with the preferred embodiment of the present invention.

FIG. 1 is a block diagram showing an arrangement of a capacitance type acceleration sensor 1 in accordance with a preferred embodiment of the present invention. FIG. 2A is a block diagram showing an arrangement of a collision judging apparatus for an automotive airbag system that incorporates the acceleration sensor 1 in accordance with the preferred embodiment of the present invention.

As shown in FIG. 2A, the collision judging apparatus includes a pair of acceleration sensors 1a and 1b each generating an output signal representing the magnitude and direction of an acceleration applied to an automotive vehicle. Furthermore, the collision judging apparatus includes a judging section 8 that judges the collision of the automotive vehicle based on output signals Go1 and Go2 of the acceleration sensors 1a and 1b and also judges the failure of respective acceleration sensors 1a and 1b. The acceleration sensors 1a and 1b have the same arrangement and are hereinafter expressed collectively as acceleration sensor 1 unless each sensor needs to be explained independently.

The acceleration sensor 1 of this embodiment, as shown in FIG. 1, consists of a sensor element 2 and a detection circuit 3. The detection circuit 3 is substantially identical in arrangement with the detection circuit 103 of the above-described apparatus 101 except for a set value of the adjusting voltage DAout to be adjusted by the variable resistors 74 and 75.

On the other hand, the sensor element 2 is substantially identical in arrangement with the sensor element 102 of the above-described apparatus 101 except for addition of a capacitor 23 connected in parallel with a capacitor 22 constituted by a movable electrode 2a and a stationary electrode 2c. A capacitance C3 of the capacitor 23 has the largeness capable of causing an intermediate output LPFout in a stationary condition (i.e., when no acceleration is applied) to deviate from a predetermined failure judgment unable region of the sensor output Gout.

Figure 3:
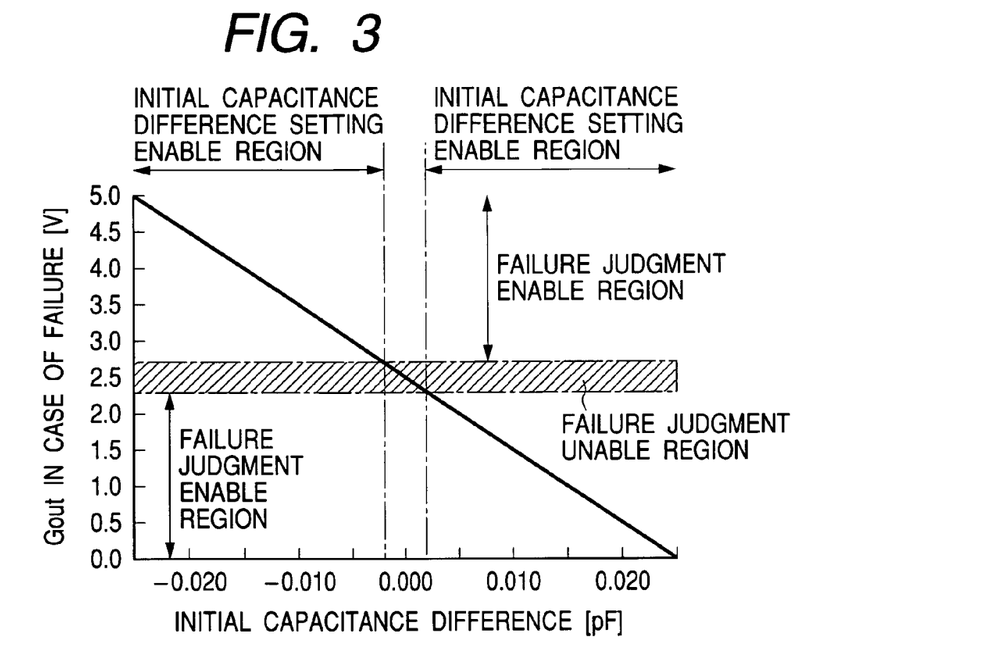
FIG. 3 is a graph showing the relationship between the capacitance difference of differential capacitors and the failed sensor output in accordance with the preferred embodiment of the present invention.

More specifically, it is now assumed that the power source voltage is VDD=5V and the failure judgment unable region is set to a range from 2.3V to 2.7 V (Vref±0.2 V), and the amplification rate in the correcting circuit 7 is R1/R2=10. In this case, as shown in FIG. 3, the capacitance C3 is set in such a manner that a capacitance difference between the capacitance C1 of the capacitor 21 and a composite capacitance C2+C3 of the capacitors 22 and 23 is not smaller in its absolute value than 0.002 pF. (i.e., $|C1-(C2+C3)| \geq 0.002$ pF)

If there is an actual capacitance difference $|C1-C2|<0.02$ pF already exists in the manufactured condition of the capacitors 21 and 22 even in the case that the capacitors 21 and 22 are designed to have the relationship C1=C2 in the stationary condition, it will be desirable to set the capacitance C3 of the capacitor 23 so as to satisfy the condition C3>0.022 pF.

When the capacitances C1 to C3 of respective capacitors 21 to 23 are set according to the above-described setting, the intermediate output LPFout in the stationary condition becomes different from the reference voltage Vref. Therefore, the correcting circuit 7 adjusts the adjusting voltage DAout (i.e. resistance values VR1 and VR2 of variable resistors 74 and 75) in such a manner that the sensor output Gout in the stationary condition is equalized with the reference voltage (i.e. Gout=Vref=VDD/2=2.5V in this embodiment).

According to the acceleration sensor 1 of this embodiment, the sensor output in the stationary condition satisfies the condition Gout=Vref. When any acceleration is applied, the sensor output Gout varies depending on the complementary capacitance change causing in the capacitors 21 and 22. Making a judgment as to whether the sensor output Gout is larger or smaller than the reference voltage Vref makes it possible to identify the applied direction of the acceleration. Furthermore, the magnitude of the applied acceleration can be specified based on the absolute value of the difference between the sensor output Gout and the reference voltage Vref.

In an event of failure such that the intermediate output LPFout is fixed to the reference voltage Vref, the sensor output Gout in the stationary condition deviates or shifts from the reference voltage Vref by a correction amount in the correcting circuit 7. The following table 1 shows practical setting values for the capacitances C1 to C3 of respective capacitors 21 to 23 and the adjusting voltage DAout.

TABLE 1

| | | | C1 [pF] | C2 + C3 [pF] | LPFout [V] | DAout [V] | Gout [V] |
|---|---|---|---|---|---|---|---|
| Ex. 1 | Before adjustment | | 0.22 | 0.23 | 2.4 | 2.5 | 3.5 |
| | After adjustment | Normal | | | | 2.4091 | 2.5 |
| | | Failed | | | 2.5 (fixed) | | 1.5 |
| Ex. 2 | Before adjustment | | 0.22 | 0.222 | 2.48 | 2.5 | 2.7 |
| | After adjustment | Normal | | | | 2.4818 | 2.5 |
| | | Failed | | | 2.5 (fixed) | | 2.3 |

Cf=0.5 pF, R1/R2=10, Vref=VDD/2=2.5V

According to the above settings, to obtain the final output in the stationary condition satisfying the relationship Gout=2.5V, the adjusting voltage DAout needs to be set to 2.4091V in the example 1 (i.e. DAout=2.4091V) and to 2.4818V in the example 2 (i.e. DAout=2.4818V) as a calculation result based on the equations (1) and (2).

Furthermore, in the case that the intermediate output LPFout is fixed to the reference voltage (i.e. LPFout=Vref) due to the failure, the sensor output Gout in the stationary condition is fixed to 1.5V in the example 1 and to 2.3V in the example 2.

Namely, when the capacitance difference between the composite capacitance (C2+C3) of the capacitors 22 and 23 and the capacitance C1 of the capacitor 21 is larger than 0.002 pF, the signal level of the sensor output Gout in the stationary condition in case of failure deviates from the failure judgment unable region. Thus, this failure can be surely detected.

Figure 4:
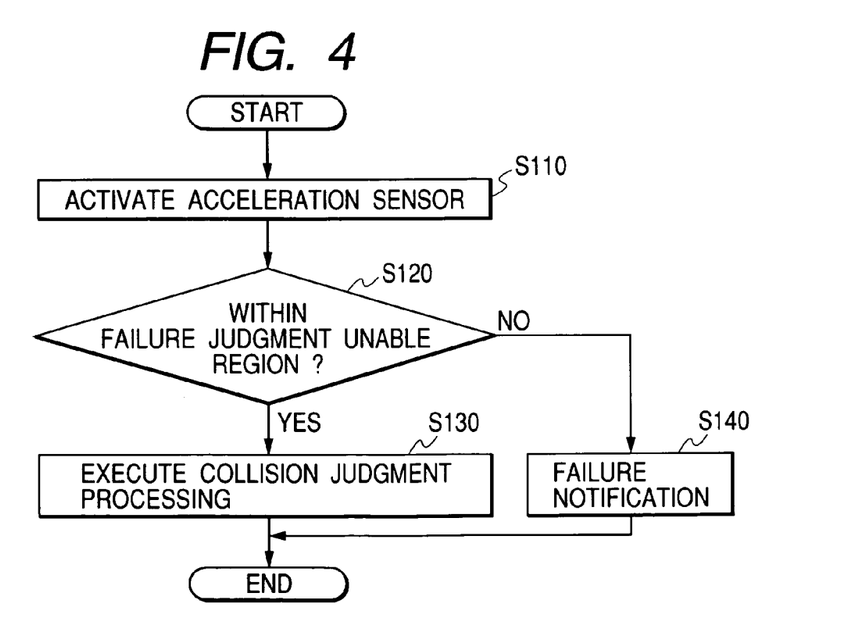
FIG. 4 is a flowchart showing the check processing executed by a judging section of the collision judging apparatus in accordance with the preferred embodiment of the present invention.

Next, the check processing executed in the engine startup condition by the judging section 8 constituting the collision judging apparatus will be explained with reference to the flowchart shown in FIG. 4. Hereinafter, the acceleration sensor 1a is referred to as a main sensor and the acceleration sensor 1b is referred to as a sub sensor. Go1 represents the sensor output Gout of the main sensor 1a and Go2 represents the sensor output Gout of the sub sensor 1b.

This processing starts in response to startup of the engine, the main sensor 1a and the sub sensor 1b are activated (i.e. connected to the power source) in step S110. The judging section 8 executes the control of voltages V1 and V2 applied to the stationary electrodes 2b and 2c constituting the sensor element 2 (i.e. the control carried out alternately between V1=VDD and V2=0 in the first period and V1=0 and V2=VDD in the second period) as well as the control of switch 43 (i.e. the control for once closing the switch 43 during the first period to discharge the capacitor 42 and then opening the switch 43).

In this condition, the judging section 8 reads the sensor output signals Go1 and Go2 of respective sensors 1a and 1b and makes a judgment as to whether or not these sensor output signals Go1 and Go2 are in the failure judgment unable region (in step S120). When both of the sensor outputs Go1 and Go2 are within the failure judgment unable region (i.e. YES in step S120), the operation of both sensors 1a and 1b is normal. Thus, the judging section 8 executes the collision judgment processing based on the sensor output signals Go1 and Go2 of respective sensors 1a and 1b (in step S130). Then, the judging section 8 terminates this processing.

On the other hand, when either one of the sensor output signals Go1 and Go2 deviates from the failure judgment unable region (i.e. NO in step S120), at least one of the sensors 1a and 1b is in the failed condition. Thus, the judging section 8 produces a failure signal to notify an external device of the abnormality of the acceleration sensor (in step S140). Then, the judging section 8 terminates this processing. For example, based on this failure notification issued in the step S140, an alarm lamp is turned on to indicate the abnormality of the airbag system.

More specifically, this processing is executed immediately after the engine starts its operation. In this condition, the automotive vehicle has not started traveling yet. In other words, no acceleration is applied on both sensors 1a and 1b. This embodiment utilizes this moment for executing the failure judgment for respective sensors 1a and 1b.

As explained above, the acceleration sensor 1 (i.e. main sensor 1a and sub sensor 1b) of this embodiment is arranged in such a manner that the sensor output Gout (Go1, Go2) surely deviates from the failure judgment unable region in case of failure corresponding to the failure mode in which the intermediate output LPFout is fixed to the reference voltage Vref. Accordingly, the collision judging apparatus incorporating the acceleration sensor 1 of this embodiment executes monitoring or checking whether the sensor output Gout is within the failure judgment unable region under the condition that no acceleration is applied, thereby easily enabling to judge the presence of any failure corresponding to above-described failure mode.

According to the above-described embodiment, the sensor element 2 serves as the sensor element of the present invention. The CV converting circuit 4, the S/H circuit 5, and the filtering circuit 6 cooperatively serves as the signal conversion circuit. The correcting circuit 7 serves as the signal correcting section of the present invention.

According to the above-described embodiment, the acceleration sensor 1 includes the capacitor 23 that is connected in parallel with the capacitor 22 to adjust the intermediate output LPFout in the stationary condition. It is needless to say that the capacitor 23 can be connected in parallel with the other capacitor 21. Regarding the provision of the capacitor 23, it is preferable to provide the capacitor 23 together with the capacitors 21 and 22 on the same substrate in the process of forming this substrate. Alternatively, it is also preferable to add the capacitor 23 later. For example, the capacitor 23 can be installed on the sensor element 2 or on the detection circuit 3 (e.g. CV conversion circuit 4) at later timing.

Furthermore, according to the acceleration sensor 1 of the above-described embodiment, manufacturing of the differential capacitors 21 and 22 basically equalizes their capacitances C1 and C2 with each other and the capacitor 23 is provided separately from these differential capacitors 21 and 22. However, it is preferable to design these differential capacitors 21 and 22 to have intended unbalance between the capacitances C1 and C2 that is equivalent to the capacitance C3 of the capacitor 23. In this case, compared with the above-described basic arrangement, the number of required electric parts (capacitors) needs not be increased. The circuit scale remains unchanged.

Furthermore, the sensor element 2 of the above-described embodiment functions as an acceleration sensor capable of causing a capacitance change in the differential capacitors 21 and 22 in response to an applied acceleration. However, it is possible to constitute the sensor element 2 of the above-described embodiment so as to act as a voltage sensor capable of causing a capacitance change in the differential capacitors 21 and 22 in response to an applied voltage. In short, the sensor element 2 of the above-described embodiment can be used to detect any dynamic quantity that causes a displacement in the beam structure incorporating the movable electrode 2a.

Figure 2B:
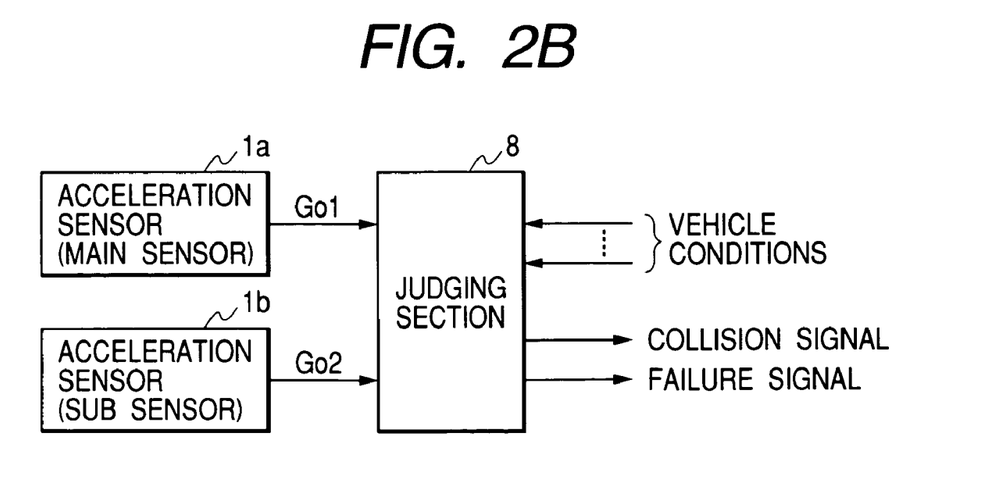
FIG. 2B is a block diagram showing the arrangement of another collision judging apparatus using the acceleration sensor in accordance with the preferred embodiment of the present invention.
Figure 5:
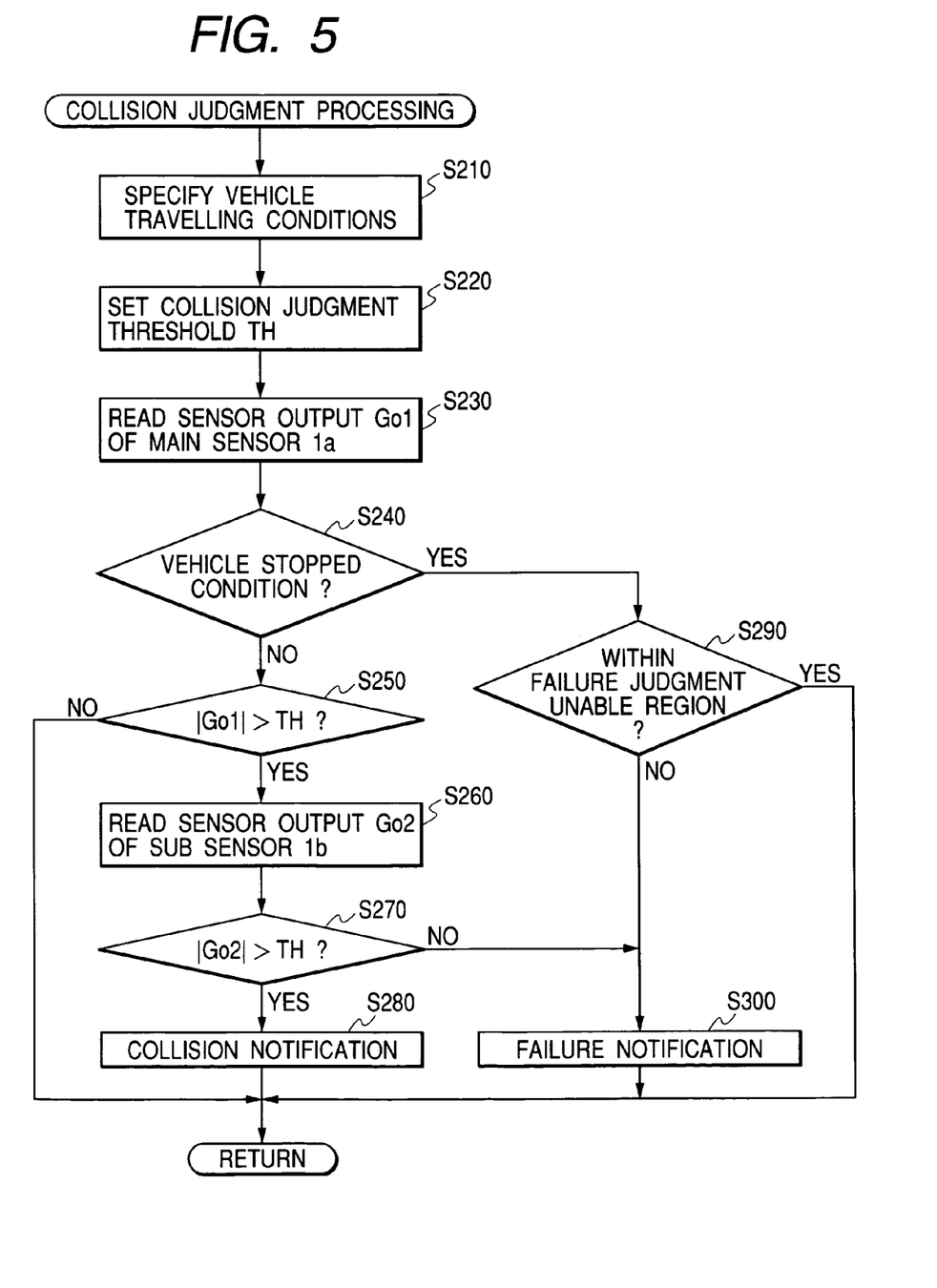
FIG. 5 is a flowchart showing the contents of the collision judgment processing executed by the judging section of the collision judging apparatus in accordance with another preferred embodiment of the present invention.

Furthermore, the above-described embodiment executes the failure judgment for the sensors 1a and 1b immediately after the engine starts its operation. However, it is possible to modify the failure judgment for the sensors 1a and 1b as part of the collision judgment processing executed in the step S130. FIG. 5 is a flowchart showing the content of the collision judgment processing executed in this case. This collision judgment processing is executed periodically. The collision judging section 8, as shown in FIG. 2b, inputs various parameters from external devices that are necessary to specify the traveling conditions of an automotive vehicle.

Once this processing starts, as shown in FIG. 5, the collision judging section 8 specifies the traveling conditions of an automotive vehicle based on various parameters entered from external devices (in step S210). Then, the collision judging section 8 sets a collision judgment threshold TH according to the specified traveling conditions (in step S220), and reads the sensor output Go1 of the main sensor 1a (in step S230).

Then, the collision judging section 8 makes a judgment based on the traveling conditions identified in the step S210 as to whether or not the automotive vehicle installing this apparatus is stopped (in step S240). When the automotive vehicle is not stopped (i.e. NO in step S240), the collision judging section 8 further makes a judgment as to whether the absolute value |Go1| of the sensor output read in the step S230 exceeds a collision judgment threshold TH (in step S250).

When the absolute value |Go1| of the sensor output does not exceed the collision judgment threshold TH (i.e. NO in step S250), the collision judging section 8 terminates this processing. On the other hand, when the absolute value |Go1| of the sensor output exceeds the collision judgment threshold TH (i.e. YES in step S250), the collision judging section 8 reads the sensor output Go2 of the sub sensor 1b (in step S260). Then, the collision judging section 8 makes a judgment as to whether the absolute value |Go2| of the readout sensor output exceeds the collision judgment threshold TH (in step S270).

When the absolute value |Go2| of the sensor output exceeds the collision judgment threshold TH (YES in step S270), the collision judging section 8 confirms the collision of the automotive vehicle installing this apparatus. Accordingly, the collision judging section 8 outputs a collision signal to notify the occurrence of vehicle collision to an external device (in step S280), and terminates this processing. For example, the airbag is actuated based on this failure notification issued in the step S280.

On the other hand, when the absolute value |Go2| of the sensor output does not exceed the collision judgment threshold TH (NO in step S270), the collision judging section 8 confirms the failure occurring in the sensor 1a or 1b and produces a failure signal to notify an external device of the abnormality of the acceleration sensor (in step S300) and terminates this processing.

Furthermore, when the automotive vehicle is stopped (i.e. YES in step S240), i.e. when no acceleration is applied on the sensors 1a and 1b, the collision judging section 8 further makes a judgment as to whether the sensor output Go1 read in the step S230 is within the collision judgment unable region (in step S290). When the sensor output Go1 is within the collision judgment unable region (i.e. YES in step S290), the operation of both sensors 1a and 1b is normal and accordingly the collision judging section 8 terminates this processing. On the other hand, when the sensor output Go1 deviates from the collision judgment unable region (i.e. NO in step S290), at least one of the sensors 1a and 1b is in the failed condition. Thus, the judging section 8 proceeds to the step S300 to execute the failure notification (in step S300). Then, the judging section 8 terminates this processing.

In short, the judging section 8 executes the sensor failure judgment when the automotive vehicle is stopped based on the sensor output Go 1 and also executes the sensor failure judgment by comparing both sensor output signals Go1 and Go2. According to this collision judging apparatus, the failure judgment for the sensors 1a and 1b can be carried out not only immediately after startup of the engine but also in the vehicle stopped condition. This improves the failure detecting capability.

What is claimed is:

1. A dynamic quantity sensor comprising:
   a signal generating section for generating a detection signal having a signal level representing an applied dynamic quantity; and
   a signal correcting section for correcting said detection signal produced from said signal generating section in such a manner that an unapplied level of said detection signal to be obtained when said dynamic quantity is not applied is equalized to a predetermined reference level,
   wherein said dynamic quantity sensor has a failure mode in which an output of said signal generating section is fixed to said reference level, and
   said signal generating section adjusts the detection signal in such a manner that said signal correcting section generates a large correction amount sufficient for an output signal from said signal correcting section to deviate from a failure judgment unable region including said reference level in case of failure corresponding to said failure mode,
   wherein said signal generating section comprises a sensor element having a movable portion causing a displacement in accordance with the applied dynamic quantity,
   said sensor element includes first and second capacitive elements cooperatively causing a complementary capacitance change in response to the displacement of said movable portion, and a third capacitive element connected in parallel with one of said first and second capacitive elements, and
   said third capacitive element and said one of said first and second capacitive elements connected in parallel with said third capacitive element are connected to common terminals at both ends thereof.

2. The dynamic quantity sensor in accordance with claim 1, wherein said signal generating section further comprises a signal conversion circuit converting the displacement of said movable portion into said detection signal having the signal level representing said applied dynamic quantity.

3. The dynamic quantity sensor in accordance with claim 2, wherein
   said signal conversion circuit includes a CV conversion circuit converting the complementary capacitance change caused in said first and second capacitive elements into a voltage change, and
   the unapplied level of said detection signal is adjusted based on a capacitance ratio of said first and second capacitive elements under a condition that said dynamic quantity is not applied.

4. The dynamic quantity sensor in accordance with claim 3, wherein said third capacitive element connected in parallel with said one of said first and second capacitive elements has a function of adjusting the capacitance ratio of said first and second capacitive elements.

5. The dynamic quantity sensor in accordance with claim 1, wherein the dynamic quantity sensor is utilized with a collision judging apparatus.

* * * * *